March 30, 1965     D. E. GELDMACHER     3,175,401

BODY TEMPERATURE INDICATOR

Filed April 12, 1962

% DICHLOROBENZENE-
TO-DIPHENYL.

INVENTOR.
DONALD E. GELDMACHER.
BY
Willard S. Grout
ATTORNEY.

3,175,401
BODY TEMPERATURE INDICATOR
Donald E. Geldmacher, 40 N. MacDonald, Mesa, Ariz.
Filed Apr. 12, 1962, Ser. No. 186,982
4 Claims. (Cl. 73—358)

This invention pertains to thermal indicators and is particularly directed to a device for indicating the temperature of the human body.

One of the objects of this invention is to provide a temperature indicating device which may be applied in the mouth to conveniently indicate a person's temperature.

Another object of this invention is to provide a series of temperature indicators which may be conveniently applied in a person's mouth and whose visual appearance at the termination of the presentation in the person's mouth will indicate the temperature limit reached.

Still another object of this invention is to provide a device having a series of temperature indicating cavities each containing a thermally indicating composition, each of different thermal characteristics adapted to visually indicate a range of temperature to which the device is subjected.

Another object is to provide a temperature indicator having a series of cavities containing chemicals which change their visual characteristics in response to temperature conditions to which they are subjected, each of which cavities having chemicals of slightly different thermal characteristics to indicate a temperature range.

A further object of this invention is to provide an extremely simple inexpensive and easily read temperature indicator for determining a person's temperature.

Another object of this invention is to provide a temperature indicator which exhibits a non-reversible visual change at a predetermined temperature.

Another object of this invention is to provide a temperature indicator which exhibits a reversible visual change at a predetermined temperature.

And a further object of this invention is to provide a recording body temperature thermometer utilizing a group of chemicals in spaced cavities each melting at a different temperature and so supported that all of the materials which melt will effect the color or appearance of the cavities to identify the maximum temperature reached during the exposure of the thermometer.

Further features and advantages of this invention will appear from a detailed description of the drawings in which:

FIG. 6 is an enlarged fragmentary section similar to FIG. 4, but showing still another modification of the device shown in storage condition.

Figure 3:
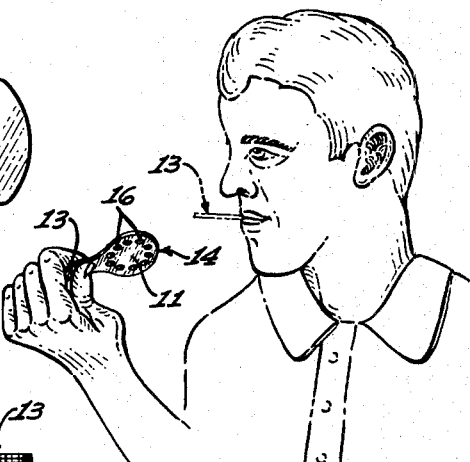
FIG. 3 is a view showing the device of FIGS. 1 and 2 in actual use.
Figure 2:
FIG. 2 is a side view of the device shown in FIG. 1.

As an example of one embodiment of this invention there is shown a body temperature thermometer comprising a top portion 10 and a bottom portion 11 which are adhesively or similarly fixed in abutting contact in the the plane 12. When so fixed together they form a manipulating handle portion 13 and an enlarged disc-shaped indicating portion 14, the latter of which is inserted in the mouth, FIG. 3 for taking a body temperature reading.

Figure 9:
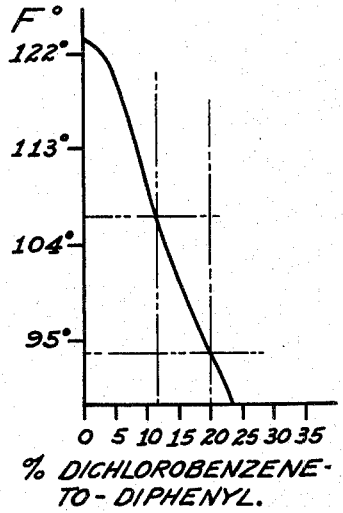
FIG. 9 is a diagram showing the thermal behavoir of an exemplar mixture for the indicating means.

The indicating portion 14 has upwardly extending dome portions 15 formed in the top portion 10 and downwardly extending depressed portions 16 formed in the bottom portion 11. The portions 15 and 16 are in register when the portions 10 and 11 are sealed together along the plane 12 so as to form temperature indicating chambers 17. A temperature sensitive material, such for example, an appropriate mixture dichlorobenzene and diphenyl 19 is placed in the cavity 17. Normally such a material is opaque below a certain temperature and becomes transparent above a certain temperature. By varying the percent of dichlorobenzene to diphenyl the critical temperature at which the mixture changes from solid to liquid can be varied as shown in the diagram, FIG. 9. The bottom portion 18 of the portion 16 is colored a bright red so that when the material 19 is elevated above a predetermined temperature its transparency will be apparent by the bright red portion 18 becoming strikingly visible.

Other temperature sensitive materials found satisfactory in the use of the device comprise the following:

| Name: | Melting point ° C. |
|---|---|
| N-phenylbenzylamine | 34–36 |
| 3,3,5-trimethylcyclonefanol | 34–37 |
| Bromo-p-xylene | 35–36.5 |
| Methyl stearate | 35–37 |
| 4 chloro-z-nitrotoluene | 35–37 |
| Tetradecanol | 35.5–37 |
| 2-ethoxynapthalene | 35.5–37 |
| M-nitroanisole | 36–38 |
| 2-chloro-g-nitrotoluene | 36–38 |
| O-nitrophenyl acetate | 37–39 |
| N,N,N',N'-tetraethylphthalamide | 37–39.5 |
| 4-bromoisoquinoline | 38–40 |
| 6-chloroquinoline | 38–41 |
| 1,2-dichloro-4-nitrobenzene | 38–41 |
| Pinacol | 38–42 |
| Tridecanoic acid | 39.5–40.5 |
| Ethyl-M-nitrobenzoate | 40–41 |
| I-indanone | 40–42 |
| 1,2-dichloro-4-nitrobenzene | 40–42 |
| 2-heptadecanone | 40–44 |
| 4,4,4 - trifluoro - 1 - (2 thienyl) 1,3-butadione | 40–44 |
| 1-bromo-2-nitrobenzene | 41–42 |
| O-diethoxybenzene | 41–43 |
| Dimethyl-tetradecanedioate | 41–43 |
| Phenyl salicylate | 42–43 |
| Dibenzylphthalate | 42–44 |
| 1,6-hexanediol | 42–44 |
| L-menthol | 42–44 |
| Nitromesitylene | 43–44 |
| Phenyl-z-pyridyl ketone | 43–45 |
| 1 chloro-3-nitrobenzene | 43–45 |
| N-butyl-p-toluenesulfonamide | 43–45 |
| 1-chloro-3-nitrobenzene | 44–45 |
| O-chlorobenzonitrile | 44–46 |
| Butyl sulfone | 44–46 |

Figure 1:
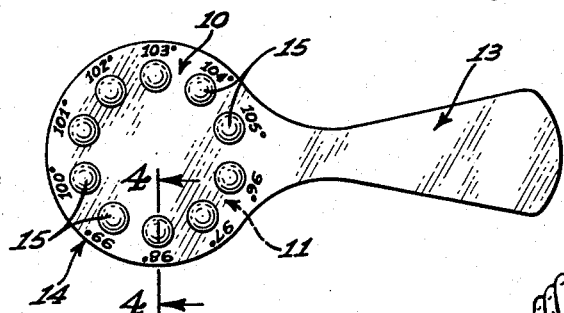
FIG. 1 is a plan view of a body temperature indicator incorporating the features of this invention.

By placing the proper temperature sensitive material in the various indicating chambers 17, various temperatures of 96° to 105° (or any other range) may be indicated as shown in FIG. 1. By inserting the device into the mouth for the required time and then removing it and reading it immediately, its melting temperature will be shown by the adjacent indicating portions, one opaque and one clear. All indicating portions subjected to temperatures below the body temperatures will remain opaque and those subjected to temperatures above will be clear. After a time as the indicating portion 14 returns to ambient temperature, all of the indicating chambers will become opaque, ready for the next test. In certain instances for some of the chemicals it may be preferable to provide a glass bubble containing the temperature sensitive material in the cavity 17.

Figure 4:
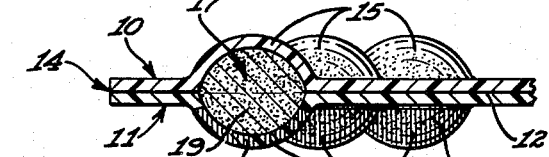
FIG. 4 is an enlarged fragmentary section of an indicator means on the line 4—4 of FIG. 1.
Figure 5:
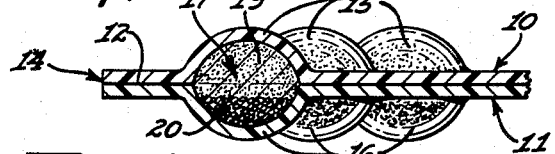
FIG. 5 is an enlarged fragmentary section similar to FIG. 4, but showing a modification of the device.

In FIG. 5 is shown an arrangement similar to FIG. 4 but utilizing a series of brightly colored glass chips 20 imbedded in the temperature sensitive material 19 in the chamber 17. In this arrangement, when the temperature sensitive material 19 liquifies, the glass chips will sink by gravity into the lower half of the cavity 17. When the temperature sensitive material solidifies, the glass chips are held in that position so that by looking up through the bottom 16 the temperature can be read from the glass chips held against the bottom 16, or from the top where those areas will no longer be colored and those areas which have not been affected will still be colored. Further, this holds and maintains the temperature reading indefinitely after removal from the mouth. Further, this instrument may be stored and reactivated by heating and turning to cool on either face since it can be read from either top or bottom portions 10 and 11.

Figure 8:
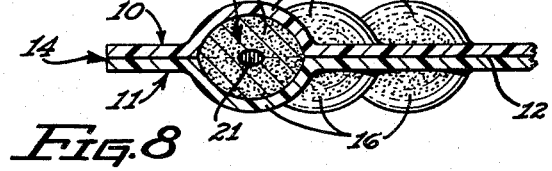
FIG. 8 is an enlarged fragmentary section similar to FIG. 4 showing a still further modification of the indicating means.

In FIG. 8 is shown an arrangement in which a pellet of red dye 21 is placed within the temperature sensitive material 19 when in dry powder form so that when the temperature sensitive material 19 liquifies at the critical temperature the dye will spread in the melted mixture and will be locked therein after it again solidifies to give a permanent record of the temperature reading.

Figure 6:
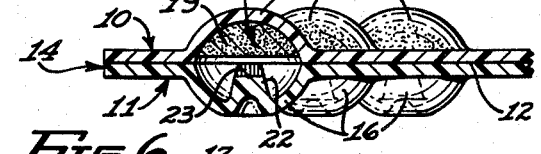
FIG. 6 is an enlarged fragmentary section similar to FIG. 4, but showing a further modification of the device.
Figure 7:
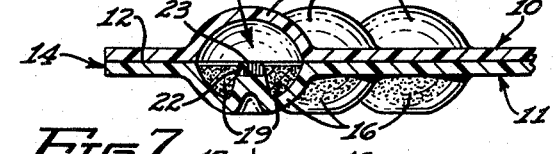
FIG. 7 is an enlarged fragmentary section similar to FIG. 6, but showing the device in active condition ready to take a temperature reading.

And still another indicating arrangement is that shown in FIGS. 6 and 7. In FIGS. 6 the temperature sensitive material is initially solidified in the upper dome portion 15 for storage and ready for use. The bottom portion 16 has an upstanding boss 22 terminating in a bright red cap 23. As the temperature sensitive material in FIG. 6 melts at critical temperature it flows down into the portion 16 exposing the indicator cap 23 and then solidifies after removal from the temperature source to maintain the temperature record indefinitely. To restore the device for further use, it is turned upside down from that shown in FIGS. 6 and 7, heated to cause the melted temperature sensitive material 19 to flow into the portion 15 and then cooled under tap water to solidify the temperature sensitive material ready for use again as shown in FIGS. 6 and 7.

While the apparatus herein disclosed and described constitutes a preferred form of the invention, it is also to be understood that the apparatus is capable of mechanical alteration without departing from the spirit of the invention and that such mechanical arrangement and commercial adaption as fall within the scope of the appendent claims are intended to be included herein.

Having thus fully set forth and described this invention what is claimed and desired to be obtained by United States Letters Patent is:

1. A body temperature indicator comprising in combination:
   (a) an indicating disc-shaped portion adapted to be subjected to the temperature conditions to be tested,
   (b) a manipulating handle attached to and extending radially outwardly from said indicating portion,
   (c) a plurality of circumferentially spaced indicating chambers formed about the periphery of said indicating portion,
   (d) temperature sensitive material in said chambers, each having a different temperature of change of state,
   (e) and means in said chambers adapted to indicate to a user of said device the temperature of change of state of said material in one or more of said chambers.

2. A body temperature indicator comprising in combination:
   (a) an indicating disc-shaped portion adapted to be subjected to the temperature conditions to be tested,
   (b) a manipulating handle attached to and extending radially outwardly from said indicating portion,
   (c) a plurality of circumferentially spaced indicating chambers formed about the periphery of said indicating portion,
   (d) a series of different temperature sensitive material in each of said chambers adapted to change from an opaque condition to a transparent condition upon said device being subjected to a particular temperature,
   (e) and means associated with said material in said chambers adapted to inform the user of the chambers in which said material has turned transparent so as to indicate the temperature to which said device has been subjected.

3. A body temperature indicator for oral application comprising in combination:
   (a) a disc-shaped top portion,
   (b) a mating disc-shaped bottom portion having a plane of abutment contact with said top portion,
   (c) a radially disposed manipulating handle extending from the edge of said top and bottom portions to provide an enlarged disc-shaped indicating portion formed integral with handle,
   (d) a series of upwardly extending dome portions formed in circumferentially spaced positions adjacent the periphery of said indicating portion of said top portion of the indicator,
   (e) a series of downwardly extending depressed portions formed in circumferentially spaced positions adjacent the periphery of said indicating portion of said bottom portion of said indicator positioned in register with said dome portions to provide temperature indicating chambers in said indicating portion of said device,
   (f) a temperature sensitive material in said chambers adapted to change from solid to liquid when said disc-shaped indicating portion is placed in the mouth.
   (g) and eye catching indicia in said chambers to indicate the state of the material in said chambers as an indication of the temperature to which said indicator has been subjected.

4. A body temperature indicator for oral application comprising in combination:
   (a) a disc-shaped top portion,
   (b) a mating disc-shaped top portion having a plane of abutment contact with said bottom portion,
   (c) a radially disposed manipulating handle extending from the edge of said top and bottom portions to provide an enlarged disc-shaped indicating portion formed integral with handle,
   (d) a series of upwardly extending dome portions formed in said indicating portion of said top portion of the indicator,
   (e) a series of downwardly extending depressed portions formed in circumferentially spaced positions adjacent the periphery of said indicating portion of said bottom portion of said indicator positioned in register with said dome portions to provide temperature indicating chambers in said indicating portion of said device,
   (f) a temperature sensitive material in said chambers adapted to change from solid to liquid when said disc-shaped indicating portion is placed in the mouth, (g) an eye catching indicia in said chambers to indicate the state of the material in said chambers as an indication of the temperature to which said indicator has been subjected, (h) said indicia comprising an upstanding boss in said chambers, (j) and a red indicating cap on top of said boss adapted to be exposed during the change of state of said temperature sensitive material at a particular temperature to which the device is subjected.

References Cited by the Examiner

UNITED STATES PATENTS 1,623,666 4/27 Ferkel.
1,633,298 6/27 Wanamaker.

FOREIGN PATENTS 523,896 4/21 France.

ISAAC LISANN, *Primary Examiner.*